US010563054B2

(12) United States Patent
Vielsack

(10) Patent No.: US 10,563,054 B2
(45) Date of Patent: Feb. 18, 2020

(54) THERMOPLASTIC ELASTOMER COMPOSITION OF AN ELASTOMER AND A NON-ELASTOMERIC POLYOLEFIN WHICH IS FUNCTIONALIZED WITH AN ANHYDRIDE OF AN ORGANIC CARBOXYLIC ACID

(71) Applicant: KRAIBURG TPE GmbH & Co. KG, Waldkraiburg (DE)

(72) Inventor: Frieder Vielsack, Waldkraiburg (DE)

(73) Assignee: Kraiburg TPE GmbH & Co. KG, Waldkraiburg (DE)

( * ) Notice: Subject to any disclaimer, the term of this patent is extended or adjusted under 35 U.S.C. 154(b) by 0 days.

(21) Appl. No.: 15/443,315

(22) Filed: Feb. 27, 2017

(65) Prior Publication Data

US 2017/0253731 A1 Sep. 7, 2017

(30) Foreign Application Priority Data

Mar. 3, 2016 (DE) .......................... 10 2016 103 823

(51) Int. Cl.
| | |
|---|---|
| *C08L 23/08* | (2006.01) |
| *C08L 31/04* | (2006.01) |
| *C08L 9/06* | (2006.01) |
| *C08L 21/00* | (2006.01) |
| *C08L 9/00* | (2006.01) |
| *C08L 11/00* | (2006.01) |
| *C08F 255/02* | (2006.01) |
| *C08L 7/00* | (2006.01) |
| *C08L 9/02* | (2006.01) |
| *B29B 7/48* | (2006.01) |
| *B29K 23/00* | (2006.01) |

(52) U.S. Cl.
CPC ........ *C08L 23/0853* (2013.01); *C08F 255/02* (2013.01); *C08L 7/00* (2013.01); *C08L 9/00* (2013.01); *C08L 9/02* (2013.01); *C08L 9/06* (2013.01); *C08L 11/00* (2013.01); *C08L 21/00* (2013.01); *C08L 31/04* (2013.01); *B29B 7/48* (2013.01); *B29K 2023/083* (2013.01); *C08L 2205/03* (2013.01)

(58) Field of Classification Search
None
See application file for complete search history.

(56) References Cited

U.S. PATENT DOCUMENTS

| 4,298,712 A | 11/1981 | Machonis, Jr. et al. |
|---|---|---|
| 4,409,365 A | 10/1983 | Coran et al. |
| 4,452,942 A | 6/1984 | Shida et al. |
| 4,728,692 A | 3/1988 | Sezaki et al. |
| 5,843,577 A * | 12/1998 | Ouhadi ................ C08G 81/028 428/474.7 |
| 6,028,142 A | 2/2000 | Garois |
| 8,481,637 B2 | 7/2013 | Kim et al. |
| 2002/0077406 A1 | 6/2002 | Yu et al. |
| 2013/0340280 A1 | 12/2013 | Swigart et al. |
| 2015/0252179 A1 | 9/2015 | Kwon et al. |
| 2018/0291203 A1* | 10/2018 | Adur ................... C08L 23/0869 |

FOREIGN PATENT DOCUMENTS

| CN | 101 948 599 B | 1/2011 |
|---|---|---|
| CN | 101948599 A * | 1/2011 |
| CN | 104 829 940 A | 5/2015 |
| DE | 101 45 155 A1 | 5/2002 |
| DE | 112005003235 T5 | 10/2007 |
| EP | 0 481 789 A2 | 4/1992 |
| EP | 1 882 721 A1 | 1/2008 |
| JP | 56-159239 A | 12/1981 |
| JP | 61-019647 A | 1/1986 |
| JP | 06-207110 A | 7/1994 |
| JP | 2004250815 A | 9/2004 |
| JP | 2004256621 A | 9/2004 |
| JP | 2006199934 A * | 8/2006 |

OTHER PUBLICATIONS

JP 2006199934 A machine translation.*
Machine translation JPH06207110 A.*
Machine translation CN 101948599A.*
(Continued)

*Primary Examiner* — Ana L. Woodward
(74) *Attorney, Agent, or Firm* — Thrive IP®; Georg Hasselmann

(57) ABSTRACT

A thermoplastic elastomer composition of an elastomer and a non-elastomeric polyolefin which is functionalized with an anhydride of an organic carboxylic acid is disclosed. Furthermore, the invention also relates to the use of a mixture of an elastomer and a cross-linking agent for the elastomer for producing a thermoplastic elastomer composition. A further subject of the invention is the use of a non-elastomeric polyolefin which is functionalized with an anhydride of an organic carboxylic acid for producing a thermoplastic elastomer composition. In addition, the invention relates to the use of a thermoplastic elastomer composition for producing an article/composite material with a polyamide. The invention also relates to a process for producing a thermoplastic elastomer composition as well as a composite material made of the thermoplastic elastomer composition with a polyamide.

13 Claims, No Drawings

(56) References Cited

OTHER PUBLICATIONS

Römpps Chemie-Lexikon, "Extrudieren," Otto-Albrecht Neumüller, 8th Edition, Franckh Stuttgart, 1981—English-language translation attached.
Saechtling, H. J.: Kunststoff-Taschenbuch, 26. Edition, Chapter 3.2.4, Oberbach, K. (Editor), Carl Hanser Verlag, Munchen, 1995—English-language translation attached.
Saechtling, H. J.: Kunststoff-Taschenbuch, 26. Edition, Chapter 7.1, Oberbach, K. (Editor), Carl Hanser Verlag, München, 1995—English-language translation attached.
G. Holden et al. "Thermoplastic Elastomers" 3rd Edition, 2004.
Extended European Search Report issued in counterpart application EP 17158649.8, dated Jul. 17, 2017.
English-language translation of Office action by the Japanese Patent Officei ssued in counterpart application JP 2017-039559, dated Feb. 5, 2018.

* cited by examiner

THERMOPLASTIC ELASTOMER COMPOSITION OF AN ELASTOMER AND A NON-ELASTOMERIC POLYOLEFIN WHICH IS FUNCTIONALIZED WITH AN ANHYDRIDE OF AN ORGANIC CARBOXYLIC ACID

CROSS-REFERENCE TO RELATED APPLICATION

This application is claiming priority from German application DE 10 2016 103 823.7, filed Mar. 3, 2016, the entire content thereof is incorporated herein by reference.

TECHNICAL FIELD

The present invention relates to a thermoplastic elastomer composition of an elastomer and a non-elastomeric polyolefin which is functionalized with an anhydride of an organic carboxylic acid. Furthermore, the present invention also relates to the use of a mixture of an elastomer and a cross-linking agent for the elastomer for producing a thermoplastic elastomer composition according to the invention. A further subject of the present invention is the use of a non-elastomeric polyolefin which is functionalized with an anhydride of an organic carboxylic acid for producing a thermoplastic elastomer composition according to the invention. In addition, the present invention relates to the use of a thermoplastic elastomer composition according to the invention for producing a composite material with a polyamide. The present invention also relates to a process for producing a thermoplastic elastomer composition according to the invention as well as an article made of the thermoplastic elastomer composition according to the invention with a polyamide.

BACKGROUND

In the state of the art only thermoplastic elastomer compositions such as for example THERMOLAST® K, THERMOLAST® V, THERMOLAST® A and HIPEX® from Kraiburg TPE GmbH & Co. KG are known, which have either a good adhesion to thermoplasts, such as polyamides, or a good chemical resistance. No thermoplastic elastomer compositions are known which have both a good adhesion to polyamides and a good chemical resistance. The latter applies in particular in the most required Shore A hardness range of from 30 to 90. By "chemical resistance" is meant, according to the invention, preferably a resistance to vehicle operating fluids, such as engine oils, transmission oils, fuels such as gasoline and diesel, as well as other operating fluids such as AdBlue® or coolants.

There is thus a requirement, in particular in the automotive sector as well as its plastics-processing supply industry, for thermoplastic elastomer compositions which have a good adhesion to polyamides and a good chemical resistance.

SUMMARY

An object of the present invention was therefore to provide a thermoplastic elastomer composition which has both a good 15 adhesion to thermoplasts, such as polyamides, and a good chemical resistance. In addition, the hardnesses of the thermoplastic elastomer compositions should lie in the range of from 30 to 90 Shore A (ShA).

An object according to the invention is achieved by the provision of a thermoplastic elastomer composition which contains an elastomer and a thermoplast, wherein the thermoplast is a non-elastomeric polyolefin which is functionalized with an anhydride of an organic carboxylic 25 acid and wherein the elastomer comprises an elastomer which is selected from the group of elastomers which consists of ethylene-vinyl acetate copolymer, nitrile butadiene rubber, hydrogenated nitrile butadiene rubber, butyl rubber, natural rubber, isoprene rubber, acrylate rubber, ethylene acrylate 30 rubber, silicone rubber, styrene butadiene rubber, chloroprene rubber, bromobutyl rubber, epichlorohydrin rubber, epoxidized natural rubber and a mixture of two or more of the named elastomers, wherein the elastomer can be present as cross-linked or non-cross-linked elastomer.

DESCRIPTION OF EXEMPLARY EMBODIMENTS

According to the present application, by a "thermoplastic elastomer" is meant a TPE which consists of a polymer or a polymer mixture (blend) and at its temperature of use has properties which are similar to those of vulcanized rubber which however, at raised temperatures, can be processed and worked up like a thermoplastic material. The same also applies to the thermoplastic elastomer compositions according to the invention.

In particular the present invention also relates to an embodiment in which, in the thermoplastic elastomer composition according to the invention, the elastomer comprises an elastomer which is selected from the group of elastomers which consists of ethylene-vinyl acetate copolymer, nitrile butadiene rubber, hydrogenated nitrile butadiene rubber, butyl rubber, natural rubber, isoprene rubber, acrylate rubber, ethylene acrylate rubber and a mixture of two or more of the named elastomers, wherein the named elastomers can be present as cross-linked or non-cross-linked elastomers. It is particularly preferred that the elastomer comprises an elastomer which is selected from the group of elastomers which consists of ethylene-vinyl acetate copolymer, nitrile butadiene rubber and a mixture of both elastomers, wherein the elastomers can be present as cross-linked or non-cross-linked elastomers.

It is further preferred that the elastomer in the composition according to the invention consists of one or more of the named elastomers.

The composition according to the invention can be present cross-linked or non-cross-linked, and can comprise a cross-linking agent or no cross-linking agent. There are in principle different states in which the thermoplastic elastomer composition according to the invention can be present:

a) the elastomer is present cross-linked and the thermoplastic elastomer composition according to the invention contains no further cross-linking agent;

b) the elastomer is present (partially) cross-linked and the thermoplastic elastomer composition according to the invention furthermore contains a cross-linking agent;

c) the elastomer is present non-cross-linked and the composition according to the invention contains a cross-linking agent;

d) the elastomer is present non-cross-linked and the composition preferably also contains no cross-linking agent.

In an embodiment of the present invention it is therefore preferred that the thermoplastic elastomer composition according to the invention additionally comprises a cross-linking agent. The cross-linking agents listed below-depending on the elastomer used—can be used as cross-linking agents in the thermoplastic elastomer composition according to the invention.

In an alternative embodiment it is preferred that in the thermoplastic elastomer composition according to the invention the elastomer is present as cross-linked elastomer.

In a further embodiment it is however preferred that in the thermoplastic elastomer composition according to the invention the elastomer is present as cross-linked elastomer.

In a further embodiment of the present invention, it is preferred that in the thermoplastic elastomer composition according to the invention the functionalization of the non-elastomeric polyolefin takes place with an anhydride of an organic carboxylic acid by means of an organic dicarboxylic acid, preferably an organic 1,2-dicarboxylic acid.

Particularly preferably the functionalization of the non-elastomeric polyolefin takes place by means of a substituted or unsubstituted succinic anhydride.

The anhydride of an organic carboxylic acid is preferably bound to the non-elastomeric polyolefin via a covalent bond and is produced by grafting. For this, an anhydride of an organic carboxylic acid is "grafted on" to a suitable non-elastomeric polyolefin (grafting process). An anhydride of an organic acid which has a reactive double bond, for example maleic anhydride, is preferably used for this. The polyolefin which is functionalized with an anhydride of an organic carboxylic acid, and production by means of grafting are described in more detail below.

In a further embodiment of the present invention, the non-elastomeric polyolefin in the thermoplastic composition according to the invention is preferably a polypropylene.

Quite particularly preferably, the non-elastomeric polyolefin which is functionalized with an anhydride of an organic carboxylic acid is a polypropylene grafted with maleic anhydride (PP-g-MAH). During the grafting, a single bond is formed from the double bond in the ring of the maleic anhydride, with the result that the radical bound to the polymer is a succinic anhydride radical.

In a further embodiment of the present invention the thermoplastic elastomer composition according to the invention preferably additionally comprises a thermoplastic elastomer based on polyolefin block copolymers (TPO). The TPO used according to the invention is preferably a block copolymer which comprises or consists of at least two different alkylene units. By "alkylene units" is meant the repeat units of the polymer from which the polymer is formed by polymerization. It is here particularly preferred that the block copolymer comprises ethylene and propylene units or consists of these units. If a TPO is used in the composition according to the invention, the weight ratio of elastomer to TPO preferably lies in the range of from 100:5 to 100:45, more preferably in the range of from 100:10 to 100:30.

In a further embodiment of the present invention the thermoplastic elastomer composition according to the invention preferably additionally comprises a thermoplastic elastomer based on polyolefin block copolymers (TPO) which for its part is functionalized with an anhydride of an organic carboxylic acid (also named functionalized TPO). The functional group is preferably a substituted or unsubstituted succinic anhydride. The functionalized TPO is preferably produced by means of grafting (grafting process) and is referred to as grafted TPO (abbreviated to: g-TPO). Here too—as in the case of the non-elastomeric polyolefin which is functionalized with an anhydride of an organic carboxylic acid—a further molecule (or several molecules) is (are) grafted onto a TPO, preferably a TPO as described above. Suitable TPOs and g-TPOs according to the invention are described below.

In the thermoplastic elastomer composition according to the invention, the weight ratio of elastomer to thermoplast preferably lies in the range of from 100:15 to 100:60, more preferably in the range of from 100:20 to 100:50.

The cross-linking agents listed below—depending on the elastomer used—can be used as cross-linking agents in the thermoplastic elastomer composition according to the invention.

The thermoplastic elastomer composition can in addition contain a plasticizer. Corresponding plasticizers which can be used according to the invention are also described below. The plasticizer is here preferably used in a weight ratio of elastomer to plasticizer in the range of from 100:40 to 100:15, more preferably in a range of from 100:30 to 100:20.

Furthermore, the thermoplastic elastomer composition according to the invention can also contain further additives such as a stabilizer, an auxiliary material, a dye, a filler and/or a compatibilizer. These are also described in more detail below.

A stabilizer, auxiliary material and/or dye is preferably used in each case in a weight ratio of elastomer to the named substances used in a range of from 100:4 to 100:0.01 and more preferably in a range of from 100:0.05 to 100:1. A filler is preferably used in a weight ratio of elastomer to filler in a range of from 100:100 to 100:1.

In addition to the cross-linking agent the thermoplastic elastomer composition according to the invention can also contain a co-crosslinker. Co-crosslinkers that can be used according to the invention are also described below.

The present invention also relates to the use of a mixture of an elastomer and a cross-linking agent for the elastomer for producing a thermoplastic elastomer composition according to the invention, wherein the elastomer is selected from the same group of elastomers which are named above in connection with the thermoplastic elastomer composition according to the invention. The elastomers mentioned as preferred are also preferred in the use according to the invention. The weight ratio of elastomer to cross-linking agent preferably also lies in the range indicated for the thermoplastic elastomer composition according to the invention.

The use of the mixture of an elastomer and a cross-linking agent for the elastomer according to the invention can additionally include a co-crosslinker, a plasticizer or a further additive. The co-crosslinkers, plasticizers or further additives also named above in connection with the thermoplastic elastomer composition according to the invention are also preferably used here. The weight ratios indicated in connection with the thermoplastic elastomer composition according to the invention are also preferred here.

The present invention furthermore relates to the use of a non-elastomeric polyolefin which is functionalized with an anhydride of an organic carboxylic acid for producing an elastomer composition according to the invention. Furthermore, in the use according to the invention, a thermoplastic elastomer based on polyolefin block copolymers (TPO) can be admixed with the non-elastomeric polyolefin. Furthermore, in the use according to the invention, a g-TPO can be admixed with the non-elastomeric polyolefin. TPO, g-TPO as well as non-elastomeric polyolefins which are functionalized with an anhydride of an organic acid are described below.

The present invention also relates to the use of a thermoplastic elastomer composition according to the invention for producing an article with a polyamide, or for the adhesion of the thermoplastic elastomer composition according to the invention to a polyamide. In other words, the present invention also relates to a process for producing an article, e.g. in the form of a composite material, made of the thermoplastic elastomer composition according to the invention and a polyamide, wherein the thermoplastic elastomer composition is combined with a polyamide. In the use according to the invention or the process according to the invention, injection moulding, multi-component injection moulding, injection moulding around inserts, extrusion or compression moulding is used as processing method for producing the articles, wherein injection moulding, multi-component injection moulding, injection moulding around inserts and extrusion are preferred, and multi-component injection moulding is quite particularly preferred.

Thus the present invention also relates to an article, e.g. in the form of a composite material, made of a thermoplastic elastomer composition according to the invention and a polyamide.

By a "polyamide" is meant according to the invention a linear polymer which has regularly repeating amide bonds along the main chain of the polymer. Examples of this are polycaprolactam (PA6), poly(N,N'-hexamethyleneadipinediamide) (PA6,6), poly(hexamethylene sebacamide) (PA6,10), polyundecanolactam (PA11) and polylauryllactam (PA12).

The present invention also relates to the use of a thermoplastic elastomer composition according to the invention for producing components or shaped bodies in automobile interiors as well as under the hood, i.e. in the engine space of vehicles, for producing industrial devices, industrial tools, bathroom fittings, domestic appliances, consumer electronics devices, sporting goods, medical consumables and devices, containers for sanitary products and cosmetics and sealing materials in general.

Furthermore, the present invention also relates to a process for producing a thermoplastic elastomer composition according to the invention, wherein an elastomer is mixed with a thermoplast, wherein the elastomer is selected from the group of elastomers which are indicated above in connection with the thermoplastic elastomer composition according to the invention, and wherein the thermoplast is one such as further indicated in connection with the thermoplastic elastomer composition according to the invention. The elastomers and thermoplasts indicated as preferred are also preferred here. The weight ratios indicated in the thermoplastic elastomer composition according to the invention are also the ratios in which the components are used in the process according to the invention. Preferred process details are described below.

The components named above and used in the thermoplastic elastomer compositions according to the invention or the uses and processes according to the invention are described in more detail hereafter:
A: elastomer
B: non-elastomeric polyolefin which is functionalized with an anhydride of an organic carboxylic acid
C: thermoplastic elastomer based on polyolefin block copolymers (TPO) and/or functionalized g-TPO
D: cross-linking agent
E: co-crosslinker
F: plasticizer
G: stabilizer, auxiliary material, dye
H: filler Component A: Elastomer By the term "elastomer" is meant not only a single elastomer, but also a mixture of two or more elastomers. In all the embodiments according to the invention, the elastomer contains (or consists of) an elastomer which is selected from the group of elastomers which consists of ethylene-vinyl acetate copolymer, nitrile butadiene rubber, hydrogenated nitrile butadiene rubber, butyl rubber, natural rubber, isoprene rubber, acrylate rubber, ethylene acrylate rubber, silicone rubber, styrene butadiene rubber, chloroprene rubber, bromobutyl rubber, epichlorohydrin rubber, epoxidized natural rubber or a mixture of the named elastomers. A single one of the named elastomers, but also a combination of two or more of the named elastomers can be used as elastomer. The elastomers can be present in the thermoplastic elastomer composition according to the invention in their non-cross-linked form, however they can also be present cross-linked.

Descriptions of the individual classes of elastomer as well as commercially available products are to be found for example in Chapter 7.1. of "K. Oberbach, Kunststoff Taschenbuch [Plastics Handbook], Carl Hanser Verlag Munich Vienna, 26th edition (1995)".

Ethylene-vinyl acetate copolymers (EVM) are copolymers of ethylene and vinyl acetate. EVMs are commercially available for example under the trade names Levapren® or Levamelt® from Lanxess Deutschland GmbH. Ethylene-vinyl acetate copolymers preferably used according to the invention are Levamelt® 400 (40±1.5 wt.-% vinyl acetate), Levamelt® 450 (45±1.5 wt.-% vinyl acetate), Levamelt® 452 (45±1.5 wt.-% vinyl acetate), Levamelt® 456 (45±1.5 wt.-% vinyl acetate), Levamelt® 500 (50±1.5 wt.-% vinyl acetate), Levamelt® 600 (60±1.5 wt.-% vinyl acetate), Levamelt® 700 (70±1.5 wt.-% vinyl acetate), Levamelt® 800 (80±2 wt.-% vinyl acetate) and Levamelt® 900 (90±2 wt.-% vinyl acetate), or the corresponding types of Levapren®, wherein Levamelt® 600 is particularly preferred. In the compositions according to the invention, an ethylene-vinyl acetate copolymer can be used as a component; however it is also possible to use mixtures of two or more ethylene-vinyl acetate copolymers. The cross-linking in the case of EVMs takes place peroxidically.

Nitrile butadiene rubber (NBR) are copolymers of acrylonitrile (ACN) and 1,3-butadiene. Due to the double bonds that they contain, NBRs can be cross-linked both peroxidically and by means of phenolic resins or sulphur. In the thermoplastic elastomer compositions according to the invention peroxidic cross-linking is preferably used. Examples of NBRs to be used according to the invention are known by the trade names Perbunan®, Krynac®, Buna® N, or Europrene® N and are commercially available.

Hydrogenated nitrile butadiene rubber (H-NBR) is obtained by hydrogenation of the double bonds contained in NBR. H—NBR can be cross-linked peroxidically. Examples of H-NBR to be used according to the invention are known by the trade names Therban® (Lanxess) and Therban® AT (Lanxess) and are commercially available.

Butyl rubber (IIR) is also named isobutene-isoprene rubber. From the group of elastomers, IIR is one of the synthetic rubbers. IIR is a copolymer of isobutene and isoprene, wherein isobutene is preferably present in a quantity of from 95 to 99 mol.-% and isoprene in a quantity of from 1 to 5 mol.-%, relative to the total molecular weight. IR is preferably cross-linked according to the invention using peroxides.

Natural rubber (NR) is a homopolymer of isoprene which comprises almost exclusively 1,4-cis linking. Typically, the average molecular weight Mw is approximately $2*10^6$ g/mol. NR is preferably cross-linked according to the invention using peroxides.

Isoprene rubber (IR) is the synthetically produced variant of natural rubber. It differs from the latter primarily due to its somewhat lower chemical purity. This is due to the fact that the catalysts used for the polymerization have a lower effectiveness than the enzymes occurring in nature. The purity of natural rubber is preferably more than 99.9%, whereas in the case of synthetically produced IR—depending on the catalyst used—only approximately 92% to 97% is achieved. Like natural rubber, IR can also be cross-linked peroxidically, phenolically or with sulphur. The cross-linking preferably takes place according to the invention using peroxides.

Acrylate rubbers (ACM) are copolymers of acrylic acid alkyl esters and a further vinylic polymer, such as for example a copolymer of acrylic acid ester and 2-chloroethyl vinyl ether or a copolymer of acrylic acid ester and acrylonitrile. The nature of the cross-linking of such polymers is dependent on the comonomers used.

Ethylene acrylate rubber (AEM) is a copolymer of ethylene and methyl acrylate. The latter is commercially available for example as Vamac® from Du Pont.

Silicone rubbers are produced from convertible materials in the rubbery-elastic state, which contain poly(organo)siloxanes and which comprise groups accessible for cross-linking reactions. In other words, silicone rubbers are poly(organo)siloxanes which are cross-linked with a cross-linking agent. The cross-linking can take place by means of (organic) peroxides; it can however also result in that Si—H groups are catalytically added to silicon-bound vinyl groups, wherein both groups are incorporated into the polymer chains or at the ends thereof.

Styrene butadiene rubber (SBR) is a copolymer of styrene and 1,3-butadiene, wherein according to the invention the styrene content should be below 25% (in relation to the butadiene content), as the rubber takes on thermoplastic properties in the case of a higher styrene content. SBR can be cross-linked both peroxidically and by means of phenolic resins as well as by means of sulphur. In the compositions according to the invention peroxidic cross-linking is preferably used here. Examples of SBR to be used according to the invention are known by the trade names Kralex® and Europrene® SBR and are commercially available.

Chloroprene rubber (CR) is also named polychloroprene or chlorobutadiene rubber and is a synthetic rubber which is also known by the trade name Neoprene. Neoprene is a trade name of the company DuPont, the trade name of Lanxess is e.g. Baypren®. Production takes place by polymerization of 2-chloro-1,3-butadiene (chloroprene).

Bromobutyl rubber (brominated IRR) is butyl rubber which is halogenated with bromine. For this, the rubber is preferably dissolved in an inert solvent and liquid bromine is added under vigorous stirring. The resulting hydrogen bromide is neutralized with sodium hydroxide solution.

Epichlorohydrin rubber (ECO) is produced by ring-opening polymerization of epichlorohydrin optionally in the presence of further comonomers. Epichlorohydrin rubber is commercially available for example under the trade name HydrinECO® from Zeon.

By "epoxidized natural rubber" is meant natural rubber as defined above, which has been epoxidized.

Component B: non-elastomeric polyolefin which is functionalized with an anhydride of an organic carboxylic acid:

According to the invention, the non-elastomeric polyolefin is functionalized with an anhydride of an organic acid as described above. The functionalization preferably takes place by means of grafting (grafting process), wherein an anhydride of an organic acid, preferably maleic anhydride, is grafted onto the side chain of a suitable non-elastomeric polyolefin.

As a basis for the grafting, non-elastomeric polyolefins customary in the trade are used, which are described below:

Non-elastomeric polyolefins are for example copolymers of polyethylene, such as HDPE (high density polyethylene), MDPE (medium density polyethylene), LDPE (low density polyethylene), LLDPE (linear low density polyethylene), VLDPE (very low density polyethylene); a homopolymer of propylene (hPP); a random copolymer of propylene and ethylene (rPP); and combinations thereof.

Non-elastomeric polyolefins suitable for the invention, as a basis for the functionalization with anhydride of a dicarboxylic acid, are above all those which are suitable for processing in injection moulding. Suitable polyolefins are those with good flow properties and rigidity.

Homopolymers of propylene (hPP) are commercially available and each of these available hPPs can be used according to the invention. The use of hPPs is preferred according to the invention.

The hPP can have a melt flow index value according to ISO 1133 (at 230° C. with 2.16 kg) in the range of from 0.5 g/10 min to 200 g/10 min, and preferably in the range of from 4 g/10 min to 50 g/10 min; a tensile strength according to ISO 527-1,-2 in the range of from 15 MPa to 50 MPa, and preferably in the range of from 20 MPa to 40 MPa; an elongation at break according to ISO 527-1,-2 in the range of from 1% to 500%, and preferably in the range of from 10% to 300%.

Commercially available hPPs are for example products from Lyondell-Basell, which are available under the trade name Moplen®, such as Moplen® HP500N and Moplen® HP501L.

Random polypropylene copolymers (rPP) are also commercially available and each of these rPPs can be used according to the invention. Ethylene and/or butene are preferred as comonomers.

The rPP can have a melt flow index according to ISO 1133 (at 230° C. with 2.16 kg) in the range of from 0.5 g/10 min to 200 g/10 min, and preferably in the range of from 4 g/10 min to 50 g/10 min; a tensile strength according to ISO 527-1,-2 in the range of from 15 MPa to 50 MPa, and preferably in the range of from 20 MPa to 40 MPa; an elongation at break according to ISO 527-1,-2 in the range of from 1% to 500%, and preferably in the range of from 10% to 300%.

Polyethylenes of different densities such as HDPE, MDPE, LDPE, LLDPE and VLDPE can be used according to the invention. These are sufficiently commercially available.

Any polyethylene can be used, the melt flow of which lies in the range of from 0.5 g/min to 10 g/10 min. HDPE can have a melt flow index according to ISO 1133 (at 190° C. with 2.16 kg) in the range of from 0.02 g/10 min to 55 g/10 min, and preferably in the range of from 0.9 g/10 min to 10 g/10 min; a tensile strength according to ISO 527-1,-2 (50 ram/min) in the range of from 12 MPa to 32 MPa, and preferably in the range of from 20 MPa to 30 MPa; an elongation at break according to ISO 527-1,-2 in the range of from 50% to 1200%, and preferably in the range of from 600% to 700%.

LDPE can have a melt flow index according to ISO 1133 (at 190° C. with 2.16 kg) in the range of from 0.5 g/10 min to 200 g/10 min, and preferably in the range of from 0.7 g/10 min to 7 g/10 min; a tensile strength according to ISO 527-1,-2 in the range of from 6 MPa to 33 MPa, and preferably in the range of from 12 MPa to 24 MPa; an elongation at break according to ISO 527-1,-2 in the range of from 100% to 800%, and preferably in the range of from 500% to 750%.

However, it is particularly preferred according to the invention that the non-elastomeric polyolefin is one which comprises propylene in its repeat units. Even more preferably, the non-elastomeric polyolefin is an hPP.

In order to obtain polyolefins which are functionalized with an anhydride of an organic acid from the named polyolefins, after their production the named polyolefins are provided with an anhydride of an organic acid by grafting.

By "grafting" is generally meant that in the case of already pre-formed molecular chains of a primary polymer (here the non-elastomeric polyolefin), side chains of other molecular building blocks (here the anhydride of the organic carboxylic acid) are "grafted on" subsequently. Such functionalized polymers are also referred to as "graft polymers". Graft polymers can be produced in various ways, e.g. after blending the primary polymer with the molecular building blocks to be grafted on in a desired ratio and subsequent formation of radicals by the decomposition of peroxides or by irradiation, preferably peroxides. Radical sites are produced on the primary polymer to which the molecular building blocks to be grafted on attach themselves. For this, the anhydride of the organic carboxylic acid must have a reactive site with which the radical site of the primary polymer can engage. Grafting can also already partially occur when a mixture of primary polymer and molecular building blocks to be grafted on is subjected to intensive mechanical-thermal treatment. The grafting reaction is preferably carried out in a rolling mill or an extruder (see also: Saechtling, H. J.: Kunststoff-Taschenbuch [Plastics Handbook], 26th edition, Oberbach, K. (ed.), Carl Hanser Verlag, Munich 1995; or: Rompps Chemie-Lexikon [Rompp's Chemistry Lexicon], Otto-Albrecht Neumüller, 8th edition, Franckh, Stuttgart 1985).

As an anhydride of an organic carboxylic acid, one which has a double bond as reactive site is preferably used. For the grafting, maleic anhydride is particularly preferably used, which is then present after the grafting as a succinic anhydride radical bound to the non-elastomeric polyolefin.

The quantity of the maleic anhydride (actually succinic anhydride radical) in the grafted non-elastomeric polyolefin lies in the range of from 0.1 wt.-% to 5 wt.-%, even more preferably in the range of from 0.5 wt.-% to 2 wt.-%, relative to the total weight of non-elastomeric polyolefin which is functionalized with an anhydride of an organic carboxylic acid.

According to the invention, polypropylene is preferably used, and hPP is particularly preferably used as a non-elastomeric polyolefin. A polypropylene grafted with maleic anhydride is also denoted PP-g-MAH in the technical field. Such a PP-g-MAH is known by the trade name "Scona® TPPP" and is available e.g. as the types "Scona® TPPP 2112 GA" or "Scona® TPPP 8112 GA".

Component C: thermoplastic elastomer based on polyolefin block copolymers (TPO) and/or functionalized g-TPO As TPOs based on polyolefin block copolymers according to the invention, those in Chapter 5 of "G. Holden, H. R. Kricheldorf, R. P. Quirk (Eds)., Thermoplastic Elastomers, Carl Hanser Verlag, third edition, Munich (2004)" can be used, wherein among the TPOs described therein, only the block copolymers (Chapter 5.1. and Chapter 5.3) are relevant to the present invention. TPOs based on blends such as for example EPDM and PP are not included in the TPOs according to the invention. The TPOs based on polyolefin block copolymers according to the invention are consequently block copolymers, the blocks of which are constructed from olefin monomers as repeat units. The TPOs based on polyolefin block copolymers according to the invention have at least two different polymer blocks. These blocks can be constructed from one type of olefin or from two or more types of olefin. The olefins used for constructing the TPO based on polyolefin block copolymers according to the invention are aliphatic olefins such as e.g. ethylene, propylene or butylene, wherein ethylene and propylene are preferred according to the invention. Particularly preferably, the TPOs based on polyolefin block copolymers according to the invention are constructed exclusively from aliphatic olefins as so-called repeat units. According to the invention, the definition of the "TPOs based on polyolefin block copolymers" excludes those that have an aromatic radical (which are known to a person skilled in the art as TPSs (thermoplastic elastomers based on styrene)). TPOs, the blocks of which are constructed from or consist of polypropylene, polyethylene or a random ethylene/propylene copolymer, are particularly preferred for the application described here or the composition according to the invention. Such TPOs are commercially available for example under the trade name Hifax CA 10 A from LyondellBasell. Furthermore, the polyolefin block copolymers described in detail in U.S. Pat. No. 8,481,637 B2 (denoted there as "olefin block copolymers, OBCs"), which are referred to here in their entirety, are particularly preferred. These are polymers which have alternating blocks of a hard (very rigid) and a soft (highly elastomeric) segment. Such products are marketed by Dow Chemicals under the trade name INFUSE™. In particular the types recommended for use for TPEs are preferred (INFUSE™ 9010, 9007, 9107, 9807).

Further examples of TPOs based on polyolefin block copolymers according to the invention are so-called hydrogenated diene block copolymers. Such polymers preferably have polymer blocks which consist of hydrogenated polybutadiene or hydrogenated polyisoprene.

The functionalized thermoplastic elastomer based on block copolymers (g-TPO) is preferably one which is functionalized with an anhydride of an organic acid. The g-TPO is preferably produced in that a TPO—as described above—is provided with an anhydride of an organic acid by grafting. For this, the same anhydrides as for component B can be used. The grafting also takes place as for component B and the preferred anhydrides indicated and quantities used there also apply for the g-TPO according to the invention. Such g-TPOs are commercially available for example under the trade name BYK LP-T 23369 from BYK.

Component D: Cross-Linking Agent

Depending on the elastomer used, it is known to a person skilled in the art, which cross-linking agent can be used in order to achieve a cross-linking. According to the invention the elastomers named above can be cross-linked either by the addition of peroxides, sulphur or metal ions.

Peroxides suitable as radical cross-linking initiators (cross-linking agents) are known to a person skilled in the art; examples of these are organic peroxides, e.g. alkyl and aryl peroxides, alkyl peracid ester, aryl peracid ester, diacyl peroxides, polyvalent peroxides such as 2,5-dimethyl-2,5-di(tert-butylperoxy)hexyne-3 (e.g. Trigonox® 145-E85 or Trigonox® 145-45 B), di-tert-butyl peroxide (e.g. Trigonox® B), 2,5-dimethyl-2,5-di(tert-butylperoxy)hexyne (e.g. Trigonox® 101), tert-butyl-cumyl peroxide (e.g. Trigonox® T), di-tert-butyl-peroxyisopropyl(benzene) (e.g. Perkadox® 14-40), dicumyl peroxide (e.g. Perkadox® BC40), benzoyl peroxide, 2,2-bis (tert-butylperoxy)diisopropylbenzene (e.g. Volcup® 40 AE), 3,2,5-trimethyl-2,5-di(benzoylperoxy)

hexane and (2,5-bis(tert-butylperoxy)-2,5-dimethylhexane, 3,3,5,7,7-pentamethyl-1,2,4-trioxepane (e.g. Trigonox® 311).

Peroxides the cross-linking temperatures of which are above the melting or softening temperatures of component A are preferably used. Because of the high melting or softening temperature of component B, according to the invention the cross-linking of the elastomeric phase (of the elastomer) for producing the thermoplastic elastomer compositions preferably takes place in a correspondingly hot melt. This requires—in a preferred embodiment—the use of peroxides with high cross-linking temperatures. Peroxides with lower (usual) cross-linking temperatures already decompose on first contact with the polymer melt and are not mixed in homogeneously and cross-link the elastomeric phase insufficiently or inhomogeneously. Therefore peroxides are particularly preferably used according to the invention, which have cross-linking temperatures of ≥175° C., particularly preferably ≥180° C., quite particularly preferably ≥185° C., especially preferably ≥190° C. and further preferably ≥200° C.

When a peroxide is used as cross-linking agent it is furthermore preferred according to the invention that the (still cross-linkable) thermoplastic elastomer compositions have a weight ratio of peroxide to elastomer in a range of from 0.1 to 5, preferably 0.5 to 5, and quite particularly preferably 0.6 to 1.8.

Cross-linking using sulphur is one of the oldest possibilities for cross-linking rubbers, which is known to a person skilled in the art in this field.

Component E: Co-Crosslinker

In a preferred embodiment according to the invention, the thermoplastic elastomer compositions additionally contain at least one co-crosslinker as component E. The co-crosslinker is used in a weight ratio of elastomer to co-crosslinker in the range of from 100:10 to 100:2 and more preferably in the range of from 100:8 to 100:3.

Suitable co-crosslinkers for peroxides as cross-linking agents are for example from the group consisting of triallyl isocyanurate (TRIC) (e.g. DIAK™-7 from DuPont), trimethylolpropane trimethacrylate (TRIM) (e.g. Rhenogran® TRIM S from Rheinchemie), N,N'-m-phenylene dimaleimide (e.g. HVA™-2® from DuPont Dow), triallyl cyanurate (TAC), liquid polybutadiene (e.g. Ricon® D153 from Ricon Resins), p-quinone dioxime, p,p'-dibenzoyl quinone dioxime, N-methyl-N,N-dinitrosoaniline, nitrobenzene, diphenylguanidine, trimethylolpropane-N,N'-m-phenylene maleimide, N-methyl-N,N'-m-phenylene dimaleimide, divinylbenzene, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate. Preferably used co-crosslinkers are selected from the group consisting of trimethylolpropane trimethacrylate (TRIM), triallyl isocyanurate (TRIC), N,N'-m-phenylene dimaleimide, triallyl cyanurate (TAC) and liquid polybutadiene. Trimethylolpropane trimethacrylate (TRIM) is particularly preferably used as co-crosslinker. It is possible, in the cross-linkable compositions according to the invention, to use one co-crosslinker or two or more co-crosslinkers jointly.

Component F: Plasticizer

Suitable plasticizers are in principle known to a person skilled in the art. Suitable plasticizers for polar elastomers (EVM, NBR, H-NBR, AEM, ACM, etc.) are e.g. ester plasticizers such as phthalic acid esters, for example dioctyl phthalate, diisooctyl phthalate, dinonyl phthalate or diisodecyl phthalate; aliphatic esters such as dioctyl acid ester or dioctyl sebacic acid ester; phosphoric acid esters such as tricresyl phosphoric acid ester, diphenyl cresylic acid ester or trioctyl phosphate; polyesters such as polyphthalic acid ester, polyadipic acid ester or polyester ether.

Suitable plasticizers for non-polar elastomers (e.g. styrene butadiene rubber) are technical or medical mineral or white oils, native oils such as for example soya or rapeseed oil, also alkylsulphonyl ester, in particular alkylsulphonyl phenyl ester, wherein the alkyl substituents contain linear and/or branched alkyl chains with >5 C atoms. Also, di- or trialkyl esters of mellitic acid, wherein the alkyl substituents preferably contain linear and/or branched alkyl chains with >4 C atoms. Furthermore, alkyl esters of di-, tri- and higher polycarboxylic acids, wherein the alkyl substituents are preferably linear and/or branched alkyl chains, are also used as corresponding plasticizers. The following may be named as examples: di-2-ethylhexyl adipate and tributyl O-acetylcitrate. Furthermore, carboxylic acid esters of mono- and/or polyalkylene glycols can also be used as plasticizers, such as for example ethylene glycol adipate.

Mixtures of the substance classes described can also be used as suitable plasticizers.

Component G: Stabilizers, Auxiliary Materials and Dyes (Additives)

Suitable additives are e.g. processing auxiliary materials, metal soaps, fatty acids and fatty acid derivatives, factice ([made-up word]: rubber-like substance which is obtained e.g. by the action of sulphur or sulphur chloride on drying oils; serves for stretching rubber), anti-ageing agents, anti-UV agents or antiozonants such as antiozonant waxes, antioxidants, e.g. polycarbodiimides (e.g. Rhenogran®, PCD-50), substituted phenols, substituted bisphenols, dihydroquinolines, diphenylamines, phenylnaphthylamines, paraphenylenediamines, benzimidazoles, paraffin waxes, microcrystalline waxes, pigments, dyes such as titanium dioxide, lithopone, zinc oxide, iron oxide, ultramarine blue, chromium oxide, antimony sulphite; stabilizers such as heat stabilizers, stabilizers against weathering; means of protection against oxidation, e.g. p-dicumyldiphenylamine (e.g. Naugard® 445), styrenated diphenylamine (e.g. Vulcanox® DDA), zinc salt of methyl mercaptobenzimidazole (e.g. Vulcanox® ZMB2), polymerized 1,2-dihydro-2,2,4-trimethylquinoline (e.g. Vulcanox® HS), thiodiethylene bis(3, 5-di-tert-butyl-4-hydroxy)hydrocinnamate, thiodiethylene bis[3-(3,5-di-tert-butyl-4-hydroxyphenyl)propionate] (e.g. Irganox® 1035), lubricants, release agents, flame retardants (fire protection agents), adhesion promoters, tracers, minerals as well as crystallization accelerators and retarders.

The following can be used as processing auxiliary materials and stabilizers: antistatics, anti-foaming agents, lubricants, dispersants, release agents, anti-blocking agents, free-radical scavengers, antioxidants, biocides, fungicides, UV stabilizers, other light stabilizers, metal deactivators, furthermore also additives such as foaming aids, propellants, fire protection agents, flue gas suppressors, impact resistance modifiers, adhesive agents, anti-fogging agents, dyes, colour pigments, colour masterbatches, viscosity modifiers and means for protection against ageing.

Stabilizers and anti-ageing agents are particularly preferably used as auxiliary materials.

Component H: Fillers

Suitable fillers are e.g. soot, chalk (calcium carbonate), kaolin, siliceous earth, talc (magnesium silicate), aluminium oxide hydrate, aluminium silicate, calcium carbonate, magnesium carbonate, calcium silicate, magnesium silicate, barium sulphate, zinc carbonate, calcined kaolin (e.g. Polestar® 200 P), calcium oxide, magnesium oxide, titanium oxide, aluminium oxide, zinc oxide, silanized kaolins, silanized silicate, coated chalk, treated kaolins, fumed silica, hydrophobic fumed silica (e.g. Aerosil® 972), synthetic amorphous precipitated silica, carbon black, graphite, nanoscale fillers such as carbon nanofibrils, nanoparticles in platelet form or nanoscale silicon dioxide hydrates and minerals.

Production of the compositions according to the invention and cross-linking or mixing to form thermoplastic elastomer compositions:

The thermoplastic elastomer compositions according to the present invention can be produced by mixing components A, B, C, D, E, F, G and H—insofar as they are present in the compositions. Mixing can take place using mixing systems known in rubber technology and plastic technology such as kneaders, internal mixers, e.g. internal mixers with intermeshing or tangential rotor geometry, as well as also in continuous mixing equipment such as mixing extruders, e.g. mixing extruders with 2 to 4 or more shaft screws (e.g. twin-screw extruders).

When carrying out the production process according to the invention it is important to ensure that the mixing temperature is sufficiently high that components B and C—insofar as they are used according to the invention—can be transformed into the plastic state, but are not damaged in the process. This is guaranteed if a temperature above the highest melting or softening temperature of components B and C—insofar as they are used according to the invention—is selected.

The components—insofar as they are present in the compositions—are particularly preferably mixed at a temperature in the range of from 150° C. to 350° C., preferably 150° C. to 280° C., particularly preferably 170° C. to 240° C.

Different variants are in principle possible for mixing the individual components.

Variant 1: A, B, C, D, E, F, G and H—insofar as they are contained in the composition according to the invention—are provided jointly and intimately mixed at temperatures above the highest melting or softening temperatures of components B and C.

Variant 2: A, B, C, F, G and H—insofar as they are contained in the composition according to the invention—are provided jointly and intimately mixed at temperatures above the highest melting or softening temperatures of components B and C. Components D and E (insofar as they are present in the formulation according to the invention) are then added and further mixed on arriving at the temperature reached.

Variant 3: A, D, E, F, G and H—insofar as they are contained in the composition according to the invention—are provided jointly and intimately mixed until below the reaction temperature of D. Components B and C are then added and heated to the softening temperature of B and C with continuous mixing. The addition of B and C can take place above or below the softening temperature of B and C.

Variant 4: B, C and H—insofar as they are contained in the composition according to the invention—are provided jointly and intimately mixed at temperatures above the highest melting or softening temperatures of components B and C. Components A, D, E, F and G (insofar as they are contained in the formulation according to the invention) are added and further intimately mixed above the highest melting or softening temperatures of components B and C.

Variant 1 is particularly preferred for production in an internal mixer. Variant 3 is particularly preferred for production in continuous mixing equipment.

By means of the above-named process variants, in particular by means of process variants 1 and 3, it is achieved that component A and components B and C have undergone the finest and most homogeneous distribution possible after completion of production.

The addition time, temperature, form and quantity of components E and F should in addition be selected such that a good distribution of components D and optionally E in the elastomer phase is guaranteed, the elastomer and thermoplast phases are present in the state described above and only then does the cross-linking of the elastomer phase take place, with the result that a phase reversal takes place or a co-continuous phase structure of the elastomeric phase and the thermoplastic phase takes place.

In the process according to the invention it is preferred that according to the indicated variant 3, the elastomer is mixed with the thermoplast (by the "thermoplast" is herein always meant the non-elastomeric polyolefin which is functionalized with an anhydride of an organic acid) in an extruder, an internal mixer or a kneader, preferably in a twin-screw extruder.

In the process according to the invention of variant 3 it is furthermore preferred that according to the indicated variant 3, the elastomer is mixed with the TPO and thermoplast in an extruder, an internal mixer or a kneader, preferably in a twin-screw extruder.

In the process according to the invention of variant 3 it is furthermore preferred that according to the indicated variant 3, the elastomer is mixed with the g-TPO and thermoplast in an extruder, an internal mixer or a kneader, preferably in a twin-screw extruder.

In the process according to the invention of variant 3, the elastomer is preferably first pre-treated in a first process step, and the thermoplast is added in a second process step.

In the first step it is preferred that the elastomer is pre-treated in an extruder, an internal mixer or a kneader, preferably in a twin-screw extruder. By "pre-treating" is preferably meant that the elastomer is softened, preferably at a temperature in the range of from 50° C. to 120° C., more preferably in the range of from 80° C. to 110° C. This pre-treatment preferably takes place in one of the devices indicated. This procedure is known to a person skilled in the art by the term "mastication". A cross-linking agent is preferably used in addition to the elastomer, with the result that the softened elastomer is (intimately) mixed together with a cross-linking agent. In addition to the elastomer and the cross-linking agent, a co-crosslinker, a plasticizer or one of the additives indicated above can also be added. The cross-linking agent, the co-crosslinker, the plasticizer or the further additives are preferably those named above in connection with the thermoplastic elastomer composition according to the invention.

Furthermore, it is preferred that in the process according to the invention preferably according to variant 3 before the second step, i.e. preferably in parallel with the first process step, the thermoplast is pre-treated in an extruder, an internal mixer or a kneader, preferably a twin-screw extruder. By "pre-treating" is preferably meant that the thermoplast is melted, preferably produced at a temperature in the range of from 160° C. to 280° C., more preferably 200° C. to 260° C. Furthermore, it is preferred that the thermoplast is melted and mixed together with the thermoplastic elastomer based on polyolefin block copolymers.

As already mentioned, after the second process step, i.e. the addition of the thermoplast to the elastomer, the resulting composition is blended. In other words, in a third process step, the mixture of elastomer and thermoplast as well as optional further components is preferably extruded, more preferably at a temperature in the range of from 180° C. to 260° C., more preferably in a range of from 200° C. to 240° C. Kneading of the batch obtained in the third process step preferably takes place in a fourth process step.

The compositions according to the invention are outstandingly suitable for providing thermoplastic elastomers with balanced properties, in particular with very good temperature and chemical resistance with simultaneously very good elastic properties (compression set, elongation at break and tensile strength) in a broad hardness range. In addition they exhibit an excellent adhesion to polyamides.

According to the present invention it is preferred that the elastomer is cross-linked during or after blending with the thermoplast, i.e. the cross-linking takes place dynamically.

The cross-linking of the preferably dispersed elastomeric phase (elastomer) preferably takes place during the mixing of components A to H (insofar as these are present in the mixture). The cross-linking preferably starts when the blending (mixing) is continued at a temperature above the melting or softening temperature of components B and C—insofar as they are present according to the invention—in the presence of components D and optionally E over a period of at least 15 sec.

After phase reversal or formation of a co-continuous phase has taken place, the product obtained, i.e. the thermoplastic elastomer composition, is cooled down preferably to a temperature below the melting or softening temperature of component(s) B and/or C—insofar as they are present according to the invention.

A further subject of the present invention is thermoplastic elastomer compositions which can be obtained by the processes according to the invention.

The terms "comprise", "contain" and "have" used in the present application are meant in each case where they are used to also cover the term "consist of", with the result that these embodiments are also disclosed in this application.

Furthermore, the present invention also relates to the following aspects:

A first aspect relates to a thermoplastic elastomer composition which contains an elastomer and a thermoplast, wherein the thermoplast is a non-elastomeric polyolefin which is functionalized with an anhydride of an organic carboxylic acid and wherein the elastomer comprises an elastomer which is selected from the group of elastomers which consists of ethylene-vinyl acetate copolymer, nitrile butadiene rubber, hydrogenated nitrile butadiene rubber, butyl rubber, natural rubber, isoprene rubber, acrylate rubber, ethylene acrylate rubber, silicone rubber, styrene butadiene rubber, chloroprene rubber, bromobutyl rubber, epichlorohydrin rubber, epoxidized natural rubber and a mixture of two or more of the named elastomers, wherein the elastomer can be present as cross-linked or non-cross-linked elastomer.

A second aspect relates to a thermoplastic elastomer composition according to aspect 1, wherein the elastomer comprises an elastomer which is selected from the group of elastomers which consists of ethylene-vinyl acetate copolymer, nitrile butadiene rubber and a mixture of the named elastomers.

A third aspect relates to a thermoplastic elastomer composition according to aspect 1 or 2, which additionally comprises a cross-linking agent.

A fourth aspect relates to a thermoplastic elastomer composition according to one of aspects 1 to 3, wherein the elastomer is present as cross-linked elastomer of the named elastomers.

A fifth aspect relates to a thermoplastic elastomer composition according to one of aspects 1 to 4, wherein the thermoplast represents the matrix into which the elastomer is incorporated.

A sixth aspect relates to a thermoplastic elastomer composition according to one of aspects 1 to 5, wherein the organic carboxylic acid is an organic dicarboxylic acid, preferably an organic 1,2-dicarboxylic acid.

A seventh aspect relates to a thermoplastic elastomer composition according to one of aspects 1 to 6, wherein the anhydride of an organic carboxylic acid is succinic anhydride, and thus is present as PP-g-MAH.

An eighth aspect relates to a thermoplastic elastomer composition according to one of aspects 1 to 7, wherein the anhydride of an organic carboxylic acid is bound to the non-elastomeric polyolefin via a covalent bond.

A ninth aspect relates to a thermoplastic elastomer composition according to one of aspects 1 to 8, wherein the molar proportion of the anhydride of an organic acid in the non-elastomeric polyolefin lies in the range of from 0.1 to 5 wt.-%, relative to the total weight of polymerized monomer units of the non-elastomeric polyolefin.

A tenth aspect relates to a thermoplastic elastomer composition according to one of aspects 1 to 9, wherein the weight ratio of elastomer to thermoplast lies in the range of from 100:15 to 100:60.

An eleventh aspect relates to a thermoplastic elastomer composition according to one of aspects 1 to 10, which additionally contains a thermoplastic elastomer based on polyolefin block copolymers (TPO).

A twelfth aspect relates to a thermoplastic elastomer composition according to aspect 11, wherein the weight ratio of elastomer to TPO lies in the range of from 100:5 to 100:45.

A 13th aspect relates to a thermoplastic elastomer composition according to one of aspects 1 to 10, which additionally contains a thermoplastic elastomer based on polyolefin block copolymers which is functionalized with an anhydride of an organic carboxylic acid (g-TPO).

A 14th aspect relates to a thermoplastic elastomer composition according to aspect 13, wherein the anhydride of an organic acid is a succinic anhydride, with the result that the g-TPO is present as g-MAH-TPO.

A 15th aspect relates to a thermoplastic elastomer composition according to aspect 13 or 14, wherein the weight ratio of elastomer to g-TPO lies in the range of from 100:10 to 100:45.

A 16th aspect relates to a thermoplastic elastomer composition according to one of aspects 1 to 15, which additionally contains a plasticizer.

A 17th aspect relates to a thermoplastic elastomer composition according to one of aspects 1 to 16, which additionally contains further additives.

An 18th aspect relates to the use of a mixture of an elastomer and a cross-linking agent for the elastomer for producing a thermoplastic elastomer composition according to one of aspects 1 to 17, wherein the elastomer comprises an elastomer which is selected from the group of elastomers which consists of ethylene-vinyl acetate copolymer, nitrile butadiene rubber, hydrogenated nitrile butadiene rubber, butyl rubber, natural rubber, isoprene rubber, acrylate rubber, ethylene acrylate rubber, silicone rubber, styrene butadiene rubber, chloroprene rubber, bromobutyl rubber, epichlorohydrin rubber, epoxidized natural rubber and a mixture of two or more of the named elastomers.

A 19th aspect relates to the use according to aspect 18, wherein the mixture can contain a co-crosslinker, a plasticizer or one or more further additives.

A 20th aspect relates to the use of a non-elastomeric polyolefin which is functionalized with an anhydride of an organic carboxylic acid for producing a thermoplastic elastomer composition according to one of aspects 1 to 17.

A 21st aspect relates to the use according to aspect 20, wherein a thermoplastic elastomer based on polyolefin block copolymers (TPO) and/or a TPO which is functionalized with an anhydride of an organic carboxylic acid is admixed with the non-elastomeric polyolefin.

A 22nd aspect relates to the use of a thermoplastic elastomer composition according to one of aspects 1 to 17 for producing a composite material with a polyamide.

A 23rd aspect relates to an article which comprises a thermoplastic elastomer composition according to one of aspects 1 to 17 and a polyamide.

A 24th aspect relates to the use of a thermoplastic elastomer composition according to one of aspects 1 to 17 for producing components or shaped bodies in automobile interiors as well as under the hood, i.e. in the engine space of vehicles, for producing industrial devices, industrial tools, bathroom fittings, domestic appliances, consumer electronics devices, sporting goods, medical consumables and devices, containers for sanitary products and cosmetics and sealing materials in general.

A 25th aspect relates to a process for producing a thermoplastic elastomer composition according to one of aspects 1 to 17, wherein an elastomer is mixed with a thermoplast, wherein the thermoplast is a non-elastomeric polyolefin which is functionalized with an anhydride of an organic carboxylic acid and wherein the elastomer comprises an elastomer which is selected from the group of elastomers which consists of ethylene-vinyl acetate copolymer, nitrile butadiene rubber, hydrogenated nitrile butadiene rubber, butyl rubber, natural rubber, isoprene rubber, acrylate rubber, ethylene acrylate rubber, silicone rubber, styrene butadiene rubber, chloroprene rubber, bromobutyl rubber, epichlorohydrin rubber, epoxidized natural rubber and a mixture of two or more of the named elastomers.

A 26th aspect relates to the process according to aspect 25, wherein the elastomer is mixed with the thermoplast in an extruder, an internal mixer or a kneader, preferably in a twin-screw extruder.

A 27th aspect relates to the process according to aspect 25 or 26, wherein in a first step the elastomer is pre-treated and in a second step the thermoplast is added.

A 28th aspect relates to the process according to aspect 27, wherein in the first step the elastomer softened by means of the temperature effect or the masticated elastomer is intimately mixed or masticated together with a cross-linking agent.

A 29th aspect relates to the process according to aspect 26 or 27, wherein before the second step the thermoplast is pre-treated in an extruder, an internal mixer or a kneader, preferably a twin-screw extruder.

A 30th aspect relates to the process according to aspect 29, wherein the thermoplast is softened and mixed or masticated together with a thermoplastic elastomer based on polyolefin block copolymers.

A 31st aspect relates to the process according to one of aspects 26 to 30, wherein the first step is carried out in a temperature range of from 50° C. to 120° C.

A 32nd aspect relates to the process according to one of aspects 29 to 31, wherein the thermoplast is masticated at a temperature in the range of from 160° C. to 280° C.

A 33rd aspect relates to the process according to one of aspects 26 to 32, wherein in a third step the mixture of elastomer and thermoplast as well as optional further components is extruded at a temperature in the range of from 180° C. to 260° C.

A 34th aspect relates to the process according to aspect 33, wherein the mixture from the third step is kneaded.

The present invention will now be explained in more detail by means of the following embodiment examples. The following embodiment examples are only exemplary in nature and do not serve to limit the present invention thereto.

EXAMPLES

Methods of Determination and Definitions:
Determination of the density takes place according to DIN EN ISO 1183-1.

Determination of the Shore hardness takes place according to DIN EN ISO 868 and DIN ISO 7619-1.

By "tensile strength" is meant the maximum mechanical tensile stress which a material withstands before it breaks/tears. In the tensile test it is calculated from the maximum tensile force relative to the original cross section of the (standardized) sample and indicated in N/mm$^2$.

The elongation at break is a material characteristic which indicates the permanent lengthening in the case of the break, relative to the initial measurement length. In material testing, elongation at break is one of many parameters and characterizes the deformation capability of a material. It is the permanent change in length $\Delta L$ relative to the initial measurement length $L_0$ of a sample in the tensile test after breaking. This change in length is indicated in %.

The compression set is a measure of how (thermoplastic) elastomers behave in the case of long-lasting, constant compression and subsequent decompression. According to DIN ISO 815 the compression set (CS) is measured at constant strain. This represents the deformation component of the test material. Many test methods for elastomers, such as e.g. tensile strength, characterize the quality and nature of the material. On the other hand, the CS is an important factor which has to be taken into account before use of a material for a specific purpose. Permanent deformation, the compression set (CS) is an important parameter, particularly for the use of seals and shims made of elastomers. In order to determine this parameter a cylindrical test piece is compressed by e.g. 25% and stored thus for a certain time at a specific temperature. The temperature and the medium (usually air, but also oils and other industrial fluids) for the compression test depend on the material to be tested, its intended purpose and the test setup (e.g. 24 h at 150° C.). 30 minutes after decompression the height is again measured at room temperature and the permanent deformation ascertained therefrom. A compression set of 0% means that the test piece has again completely reached its original thickness; a CS of 100% indicates that the test piece has been completely deformed during the test and shows no resetting. The calculation is carried out according to the following formula: CS (%)=$(L_0-L_2)/(L_0-L_1)\times 100\%$, wherein:

CS=compression set in %
$L_0$=height of the test piece before testing
$L_1$=height of the test piece during testing (spacer)
$L_2$=height of the test piece after testing.

In addition, the force in MPa according to DIN ISO 34-1, which is required to stretch the thermoplastic elastomer by 100%, 200% or 300%, was measured. Here a test piece—as defined in the named standard—is taken and stretched by the length indicated while measuring the force required.

Determination of the tear propagation resistance takes place according to DIN 53504/ISO 37.

The abrasion of the thermoplastic elastomer compositions is measured by rubbing a 6 mm high cylinder with a diameter of 16 mm over 40 m of 60-grit sandpaper with a contact pressure of 10 N.

The adhesion of the thermoplastic elastomer compositions on PA6 is determined according to VDI2019: The PA6 used is one with the product name Frianyl B3V2 NC1102.

In order to determine the media resistance, S2 test rods or platelets of the thermoplastic elastomer compositions according to the invention are stirred in the media indicated in Tables 5 to 8 at the temperatures indicated for the time indicated. The test rods are used for the mechanical measurements and the platelets for determining the density etc.

After storage in the media indicated, the change in volume, change in density and change in weight are measured. Furthermore, the tensile strength, the elongation at break and the force which is required to stretch the thermoplastic elastomer by 100%, 200% or 300% are measured once again.

Hot air ageing is carried out at 120° C. and the results achieved are shown in Table 9.

Embodiment Examples

Table 1 indicates the abbreviations used for the components used in the examples.

TABLE 1

| Component | Raw material |
|---|---|
| A | Elastomer (rubber) |
| B | Polypropylene, functionalized with an anhydride of an organic carboxylic acid |
| C | Thermoplastic elastomer based on polyolefin and/or g-TPO |
| D | Cross-linking agent |
| E | Co-crosslinker |
| F | Plasticizer |
| G | Stabilizer, auxiliary material and dye |
| H | Filler |

Examples 1 and 2: Production of Thermoplastic Elastomer Compositions According to the Invention According to the above-named production variant 3, thermoplastic elastomer compositions are produced with the constituents shown in Tables 2 and 3. A twin-screw extruder is used for blending the components used. The measured mechanical values are indicated in Table 4. Tables 5 to 7 indicate the mechanical values after treatment in various media.

TABLE 2

Compositions

| Raw material | Component | Example 1 | Example 2 |
|---|---|---|---|
| Elastomer | A1 | 100 | |
| Elastomer | A2 | | 100 |
| Non-elastomeric polyolefin (functionalized) | B | 19 | 26.7 |

TABLE 2-continued

Compositions

| Raw material | Component | Example 1 | Example 2 |
|---|---|---|---|
| TPO | C | 6.5 | 8.3 |
| Cross-linker (10 wt.-% peroxide) | D | 11 | 13.5 |
| Co-crosslinker | E | 6 | 6 |
| Plasticizer | F | 20 | 25 |
| Stabilization, auxiliary materials and colour: | G | | |
| Additive 1 | | 0.3 | 0.3 |
| Additive 2 | | 0.1 | 0.09 |
| Additive 3 | | 0.35 | |
| Additive 4 | | 0.1 | 0.09 |
| Additive 5 | | | 0.3 |
| Filler | H | 4 | 4 |

TABLE 3

Raw materials used

| Raw material | Component | Manufacturer | Type |
|---|---|---|---|
| Elastomer | A1 | Lanxess | Perbunan 3446 F |
| Elastomer | A2 | Lanxess | EVM 600 |
| Non-elastomeric polyolefin (functionalized) | B | BYK | Scona Tppp 2112 GA |
| TPO | C | Lyondell Basel | Hifax CA 10A |
| Cross-linking agent | D | Pergan | Peroxan HXY10PSVP796 |
| Co-crosslinker | E | Kettlitz | PerTAC-GR |
| Plasticizer | F | Safic Alkan | Edenol T810T |
| Stabilization, auxiliary materials and colour: | G | | |
| Additive 1 | | BASF | Tinuvin 326 |
| Additive 2 | | BASF | Chimasorb 944 FDL |
| Additive 3 | | BASF | Tinuvin 622 SF |
| Additive 4 | | BASF | Irgafos 168 |
| Additive 5 | | BASF | Irganox 1330 |
| Fillers | H | Bayer | ZnO Aktiv |

TABLE 4

Mechanical values

| Value | Unit | Example 1 | Example 2 |
|---|---|---|---|
| Density | g/cm$^3$ | 1.021 | 1.044 |
| Hardness | ShA | 70 | 70 |
| Tensile strength | N/mm$^2$ | 6.3 | 7.7 |
| Elongation at break | % | 268 | 295 |
| 100% | MPa | 3.2 | 3.8 |
| 200% | MPa | 4.8 | 5.8 |
| 300% | MPa | — | 7.8 |
| Tear propagation resistance | N/mm$^2$ | 20.6 | 17.9 |
| Compression set at 25° C./22 h | % | 30.0 | 24.0 |
| Compression set at 70° C./22 h | % | 30.5 | 26.0 |
| Compression set at 100° C./22 h | % | 35.0 | 29.0 |
| Compression set at 120° C./22 h | % | 38.0 | 36.0 |
| Compression set at 140° C./22 h | % | 57.0 | 57.0 |
| Compression set at 150° C./22 h | % | 64.5 | 67.5 |
| Adhesion on PA6 | N/mm$^2$ | 5.0 | 2.7 |
| Abrasion | mm$^3$ | 502 | 359 |

The values for density, hardness, tensile strength, elongation at break, expansion (100%, 200%, 300%) and tear propagation resistance are recorded at room temperature

TABLE 5

| Measured value | Treatment period | Medium | Temperature | Example 1 | Example 2 |
|---|---|---|---|---|---|
| Density Δ% | Start value | IRM 901 | 100° C. | 0 | 0 |
| | 1 week | | | −5.5 | 0.4 |
| | 3 weeks | | | −6.2 | 1.7 |
| Weight Δ% | Start value | | | 0 | 0 |
| | 1 week | | | −6.5 | −0.8 |
| | 3 weeks | | | −0.2 | −1.7 |
| Volume Δ% | Start value | | | 0 | 0 |
| | 1 week | | | −6.5 | −0.8 |
| | 3 weeks | | | −6.4 | 0 |
| Hardness (ShA) | Start value | | | 71 | 74 |
| | 1 week | | | 75 | 74 |
| | 3 weeks | | | 76 | 73 |
| Tensile strength (N/mm²) | Start value | | | 6.6 | 7.5 |
| | 1 week | | | 6.8 | 7 |
| | 3 weeks | | | 6.1 | 6.7 |
| Elongation at break (%) | Start value | | | 299 | 305 |
| | 1 week | | | 241 | 263 |
| | 3 weeks | | | 174 | 257 |
| 100% (MPa) | Start value | | | 3.2 | 3.6 |
| | 1 week | | | 3.8 | 3.7 |
| | 3 weeks | | | 4.3 | 3.6 |
| 200% (MPa) | Start value | | | 4.7 | 5.5 |
| | 1 week | | | 5.7 | 5.8 |
| | 3 weeks | | | 0 | 5.7 |
| 300% (MPa) | Start value | | | 7 | 7.4 |
| | 1 week | | | 0 | 0 |
| | 3 weeks | | | 0 | 0 |

TABLE 6

| Measured value | Treatment period | Medium | Temperature | Example 1 | Example 2 |
|---|---|---|---|---|---|
| Density Δ% | Start value | Diesel | RT | 0 | 0 |
| | 1 week | | | 11.9 | 37.9 |
| | 3 weeks | | | 5.8 | 33.9 |
| Weight Δ% | Start value | | | 0 | 0 |
| | 1 week | | | −6.2 | −2.5 |
| | 3 weeks | | | −2.2 | −5.8 |
| Volume Δ% | Start value | | | 0 | 0 |
| | 1 week | | | 9.1 | 29.4 |
| | 3 weeks | | | 3.5 | 26.1 |
| Hardness (ShA) | Start value | | | 71 | 74 |
| | 1 week | | | 64 | 56 |
| | 3 weeks | | | 67 | 57 |
| Tensile strength (N/mm²) | Start value | | | 6.6 | 7.5 |
| | 1 week | | | 4.3 | 3.4 |
| | 3 weeks | | | 5.2 | 3.6 |
| Elongation at break (%) | Start value | | | 299 | 305 |
| | 1 week | | | 230 | 171 |
| | 3 weeks | | | 263 | 180 |
| 100% (MPa) | Start value | | | 3.2 | 3.6 |
| | 1 week | | | 2.5 | 2.3 |
| | 3 weeks | | | 2.7 | 2.4 |
| 200% (MPa) | Start value | | | 4.7 | 5.5 |
| | 1 week | | | 3.9 | 0 |
| | 3 weeks | | | 4.1 | 0 |
| 300% (MPa) | Start value | | | 7 | 7.4 |
| | 1 week | | | 0 | 0 |
| | 3 weeks | | | 0 | 0 |

TABLE 7

| Measured value | Treatment period | Medium | Temperature | Example 1 | Example 2 |
|---|---|---|---|---|---|
| Density Δ% | Start value | Air | 100° C. | 0 | 0 |
| | 1 week | | | −0.7 | −0.1 |
| | 3 weeks | | | −0.6 | 0.5 |
| | 6 weeks | | | −1.5 | 1 |
| Weight Δ% | Start value | | | 0 | 0 |
| | 1 week | | | 0.4 | 0 |
| | 3 weeks | | | 0.5 | −0.4 |
| | 6 weeks | | | 1.3 | −1.2 |
| Volume Δ% | Start value | | | 0 | 0 |
| | 1 week | | | −0.3 | −0.1 |
| | 3 weeks | | | −0.1 | 0.2 |
| | 6 weeks | | | −0.2 | −0.2 |
| Hardness (ShA) | Start value | | | 71 | 74 |
| | 1 week | | | 72 | 75 |
| | 3 weeks | | | 72 | 74 |
| | 6 weeks | | | 77 | 75 |
| Tensile strength (N/mm²) | Start value | | | 6.6 | 7.5 |
| | 1 week | | | 6.5 | 7.8 |
| | 3 weeks | | | 6 | 7.1 |
| | 6 weeks | | | 6.1 | 7.1 |
| Elongation at break (%) | Start value | | | 299 | 305 |
| | 1 week | | | 238 | 291 |
| | 3 weeks | | | 184 | 277 |
| | 6 weeks | | | 117 | 254 |

TABLE 8

| Measured value | Treatment period | Medium | Temperature | Example 1 | Example 2 |
|---|---|---|---|---|---|
| 100% (MPa) | Start value | Air | 100° C. | 3.2 | 3.6 |
| | 1 week | | | 3.6 | 4 |
| | 3 weeks | | | 3.9 | 3.7 |
| | 6 weeks | | | 5.5 | 4 |
| 200% (MPa) | Start value | | | 4.7 | 5.5 |
| | 1 week | | | 5.6 | 6.1 |
| | 3 weeks | | | 0 | 5.7 |
| | 6 weeks | | | 0 | 6.1 |
| 300% (MPa) | Start value | | | 7 | 7.4 |
| | 1 week | | | 0 | 0 |
| | 3 weeks | | | 0 | 0 |
| | 6 weeks | | | 0 | 0 |

Examples 3 to 6: Production of Compositions of Thermoplastic Elastomers Based on SBR and NR According to the Invention According to the above-named production variant 3, a thermoplastic elastomer composition is produced with the constituents shown in Tables 9 and 10. A twin-screw extruder is used for blending the components used.

Both TPEs based on SBR and TPEs based on NR result in homogeneous mixtures. For this and for the adhesion on polyamide, the measured mechanical values and the adhesion values for TPEs based on SBR are indicated in Table 11 by way of example.

TABLE 9

Compositions

| Raw material | Component | Example 3 | Example 4 | Example 5 | Example 6 |
|---|---|---|---|---|---|
| Elastomer (SBR) | A1 | 100 | 100 | | |
| Elastomer (NR) | A2 | | | 100 | 100 |
| Non-elastomeric polyolefin (functionalized with MAH) | B | 36.7 | 45.4 | 26.7 | 33 |
| TPO (functionalized with MAH) | C1 | 18.3 | | 13.3 | |
| TPO (not functionalized) | C2 | | 9.6 | | 7 |
| Cross-linking agent (peroxide) | D | 12 | 12 | 12 | 12 |
| Co-crosslinker | E | 6 | 6 | 6 | 6 |
| Plasticizer (white oil) | F | 40 | 40 | 40 | 40 |
| Stabilization, auxiliary materials and colour: | G | | | | |
| Additive 1 | | 0.3 | 0.3 | 0.3 | 0.3 |
| Additive 2 | | 0.1 | 0.1 | 0.1 | 0.1 |
| Additive 3 | | 0.32 | 0.32 | 0.32 | 0.32 |
| Additive 4 | | 0.1 | 0.1 | 0.1 | 0.1 |
| Filler | H | 4 | 4 | 4 | 4 |

TABLE 10

Raw materials used

| Raw material | Component | Manufacturer | Type |
|---|---|---|---|
| Elastomer (SBR) | A1 | Synthesis | Kralex SBR 1502 |
| Elastomer (NR) | A2 | | Natural Rubber SIR 20 |
| Non-elastomeric polyolefin | B | BYK Additives & Instruments | Scona TPPP 2112 GA |
| TPO (functionalized) | C1 | BYK Additives & Instruments | BYK LP-T 23401 |
| TPO (not functionalized) | C2 | Lyondell Basell | Hifax CA 10A |
| Cross-linking agent (peroxide) | D | Pergan | Peroxan HXY 10 PS |
| Co-crosslinker | E | Kettlitz | PerTAC-GR |
| Plasticizer (white oil) | F | Shell | Shell Ondina 941 |
| Stabilization, auxiliary materials and colour: | G | | |
| Additive 1 | | BASF | Tinuvin 326 |
| Additive 2 | | BASF | Chimasorb 944 FDL |
| Additive 3 | | BASF | Irganox 1330 |
| Additive 4 | | BASF | Irgafos 168 |
| Fillers | H | Bayer | ZnO Aktiv |

TABLE 11

Mechanical values

| Value | Unit | Example 3 | Example 4 |
|---|---|---|---|
| Density | g/cm$^3$ | 0.96 | 0.96 |
| Hardness | ShA | 80 | 80 |
| Tensile strength | N/mm$^2$ | 5.5 | 5.4 |
| Elongation at break | % | 204 | 170 |
| 100% | MPa | 4.2 | 4.5 |
| Tear propagation resistance | N/mm$^2$ | 17.3 | 15.9 |
| Compression set at 70° C./22 h | % | 30 | 32 |
| Compression set at 100° C./22 h | % | 34 | 33 |
| Compression set at 120° C./22 h | % | 48 | 53 |
| Adhesion on PP | N/mm$^2$ | 0.7 | 1 |

The values for density, hardness, tensile strength, elongation at break, expansion (100%) and tear propagation resistance are recorded at room temperature.

The invention claimed is:

1. A thermoplastic elastomer composition comprising:
    an elastomer,
    a thermoplast, and,
    a thermoplastic elastomer,
    wherein a weight ratio of elastomer to thermoplast lies in a range of from 100:15 to 100:60,
    wherein the thermoplast is a non-elastomeric polyolefin which is functionalized with an anhydride of an organic carboxylic acid,
    wherein the elastomer is selected from the group consisting of ethylene-vinyl acetate copolymer, nitrile butadiene rubber, hydrogenated nitrile butadiene rubber, butyl rubber, natural rubber, isoprene rubber, acrylate rubber, ethylene acrylate rubber, silicone rubber, styrene butadiene rubber, chloroprene rubber, epichlorohydrin rubber, and epoxidized natural rubber, or a mixture thereof,
    wherein the thermoplastic elastomer is a polyolefin block copolymer (TPO) having at least two olefinic polymer blocks,
    wherein the TPO is optionally functionalized with an anhydride of an organic dicarboxylic acid, and
    wherein the elastomer is cross-linked,
    with the proviso that the at least two olefinic polymer blocks are not aromatic.

2. The thermoplastic elastomer composition according to claim 1, wherein the elastomer is selected from the group consisting of ethylene-vinyl acetate copolymer and nitrile butadiene rubber, or a mixture thereof.

3. The thermoplastic elastomer composition according to claim 1, wherein the organic carboxylic acid is the organic dicarboxylic acid.

4. A thermoplastic elastomer composition according to claim 1 additionally comprising a polyamide for producing a composite material.

5. An article which comprises a thermoplastic elastomer composition according to claim 1 and the thermoplastic elastomer composition additionally comprising a polyamide.

6. A thermoplastic elastomer composition according to claim 1 for producing components or shaped bodies in automobile interiors or in the engine space of vehicles, for producing industrial devices, industrial tools, bathroom fittings, domestic appliances, consumer electronics devices, sporting goods, medical consumables and devices, containers for sanitary products and cosmetics, and sealing materials.

7. A process for producing a thermoplastic elastomer composition according to claim 1, the process comprising:
 mixing the elastomer with the thermoplast and the thermoplastic elastomer.

8. The process according to claim 7, wherein the elastomer is mixed with the thermoplast in an extruder, an internal mixer or a kneader.

9. The process according to claim 8, wherein the elastomer is mixed with the thermoplast in a twin-screw extruder.

10. The process according to claim 7, further comprising:
 masticating the elastomer in a first step together with a cross-linking agent before the elastomer is mixed with the thermoplast.

11. The process according to claim 10, wherein the first step is carried out in a temperature range of from 50° C. to 120° C.

12. The thermoplastic elastomer composition according to claim 1, wherein the organic dicarboxylic acid is an organic 1,2-dicarboxylic acid.

13. The thermoplastic elastomer composition according to claim 1, wherein the organic dicarboxylic acid is succinic acid.

* * * * *